Oct. 11, 1960 W. P. HEALY 2,955,348

COLOR TELEVISION SCREEN AND METHOD OF PRODUCING SAME

Filed Sept. 13, 1954

8 Sheets-Sheet 1

INVENTOR
Wesley P. Healy
By Carlson, Pitzner, Hubbard & Wolfe
ATTORNEYS

Oct. 11, 1960 W. P. HEALY 2,955,348

COLOR TELEVISION SCREEN AND METHOD OF PRODUCING SAME

Filed Sept. 13, 1954

8 Sheets-Sheet 2

INVENTOR
Wesley P. Healy
By Carlson, Pitzner, Hubbard & Wolfe
ATTORNEYS

INVENTOR
Wesley P. Healy
By Carlson, Pitzner, Hubbard & Wolfe.
ATTORNEYS

INVENTOR
Wesley P. Healy
By Carlson, Pitzner, Hubbard & Wolfe
ATTORNEYS

INVENTOR
Wesley P. Healy
By Carlson, Pitzner, Hubbard & Wolfe
ATTORNEYS

Oct. 11, 1960 W. P. HEALY 2,955,348

COLOR TELEVISION SCREEN AND METHOD OF PRODUCING SAME

Filed Sept. 13, 1954

8 Sheets-Sheet 6

INVENTOR
Wesley P. Healy
By Carlson, Pitzner, Hubbard & Wolfe
ATTORNEYS

Oct. 11, 1960 W. P. HEALY 2,955,348

COLOR TELEVISION SCREEN AND METHOD OF PRODUCING SAME

Filed Sept. 13, 1954 8 Sheets-Sheet 7

INVENTOR
Wesley P. Healy
By Carlson, Pitzner, Hubbard & Wolfe
ATTORNEYS

Oct. 11, 1960

W. P. HEALY 2,955,348

COLOR TELEVISION SCREEN AND METHOD OF PRODUCING SAME

Filed Sept. 13, 1954

8 Sheets-Sheet 8

Inventor
Wesley P. Healy
By Carlson, Pitzner, Hubbard & Wolfe
Attorneys

United States Patent Office 2,955,348

Patented Oct. 11, 1960

2,955,348

COLOR TELEVISION SCREEN AND METHOD OF PRODUCING SAME

Wesley P. Healy, Crystal Lake, Ill.

Filed Sept. 13, 1954, Ser. No. 455,611

8 Claims. (Cl. 29—25.17)

The present invention relates to color television screens for cathode-ray tubes for television receivers upon which pictures are reproduced in full color, and has more especial reference to screens of the character embodying both line and so-called "dot" patterns of phosphors, the individual elements of each of which fluoresce one of the basic colors: red, blue, or green.

The primary aim of the invention is to provide a method of making screens of the aforesaid character which will render the manufacture of such screens economically feasible.

Another and important object is to provide an improved fluorescent screen which, when activated by an impinging electron beam, is capable of producing a picture of high intensity and good definition.

Another object is to permit the manufacture of such screens on a mass production basis through the provision of relatively simple apparatus for carrying out the improved method.

More particularly stated, the invention contemplates the manufacture of a multicolor screen for cathode-ray tubes composed of a plurality of independent strand systems, one for each of the desired basic colors to be reproduced, each system consisting of closely spaced parallel strands interposed between and parallel to adjacent strands of the other systems, with the individual strands of each system being substantially translucent and having a phosphor coating thereon.

Additionally, the present invention contemplates the provision of a multicolor screen composed of a plurality of independent strand systems, each composed of spaced parallel strands, with the strands of each system angularly crossing the strands of other systems thereby effecting a latticelike form. In this form each of the openings is bordered by a segment of a strand of each system so as to define elemental areas embracing all the phosphors fluorescing, when activated, the basic colors to be reproduced.

The invention further contemplates the production of screens of the foregoing character in which each of the strands incorporates a central conductor for controlling beam impingement and enhancing mechanical strength and a translucent coating, the strands being of generally cylindrical form to bend visible radiation from the phosphors about the conductor so as to further enhance the aforesaid screen characteristics.

In carrying out the invention, substantially translucent or transparent phosphor coated strands are placed upon a form having closely spaced parallel grooves or channels for receiving and retaining the strands so as to properly position the same and to maintain them in position for subsequent operations thereon while at the same time to protect the portions of the phosphor coatings received in the grooves while permitting removal of the portions externally thereof. Inasmuch as one form of screen to be produced comprises a single layer of strands composed of a plurality of independent strand systems, one for each of the three basic colors to be reproduced, the aforesaid grooves are arranged in groups, each group having three contiguous grooves, and preferably the support employed is in the nature of a winding drum. The contiguous sets of goroves are provided in the peripheral surface of the drum and may take the form of a triple spiral thread, thereby permitting the application of the strands to the form by a simple winding operation.

The form of screen embodying the multicolor, elemental areas is similarly produced. Thus the strands are wound upon a form having sets of spaced, parallel grooves which are angularly disposed with respect to one another and which are of different depths. Each strand system, therefore, forms a separate layer, and the layers are superimposed one upon another.

After application of the strands to the form and after removing the exposed portions of the phosphor coatings from the strands, if desired, the strands are cemented together to form a composite sheet. The coated portions of the strands within the grooves remain protected thereby. Finally, sections of the composite sheet of appropriate size are removed from the form for incorporation in the cathode-ray tube, the winding form being preferably especially constructed to facilitate such removal.

Each composite screen thus formed comprises sequentially arranged systems of strands cemented together into a sheet with the phosphors arranged in a closely spaced pattern. Each of the individual strands preferably includes a central conductor and a translucent covering about the conductor which preferably bears the phosphor coating only on one side thereof. That side, upon the incorporation of the screen in a cathode-ray tube, may be exposed for direct impingement of the electron beam. With the opposite side of the screen free of phosphor coating, interference thereby with the transmission of visible radiation from the activated phosphors is eliminated. While screens having one side free of phosphor coating are preferred, screens comprising strands coated entirely about their peripheries have proved to be satisfactory. The transparent or translucent strand coverings serve not only to permit transmission of the visible radiation, but in addition, bend such radiation about the central conductors thereby minimizing the effect of actual opacity due to the conductors. The conductors provide means whereby electron beam impingement and space charge can be accurately controlled and additionally serve to mechanically strengthen the screen.

The present invention also contemplates the production of grid structures fashioned in similar form to both the line and lattice type screens, which permit of incorporation in a cathode-ray tube in spaced relation to the screen, according to electron velocity and grid charge, so as to control beam deflection and the impingement thereof on the screen.

The preferred form of apparatus for carrying out the method thus generally set forth includes in addition to the winding forms already alluded to, means for preparing the individual strands, means for coating the strands with the desired phosphors in the case of screens, a vacuum and heat-treating device for degasifying purposes, and means permitting the removal of the sheet sections from the supporting form for incorporation in a cathode-ray tube.

The objects of the invention thus generally set forth together with other objects and ancillary advantages are attained by the construction and arrangement shown by way of illustration in the accompanying drawings, in which.

Figures 15, 16, 17, 18:
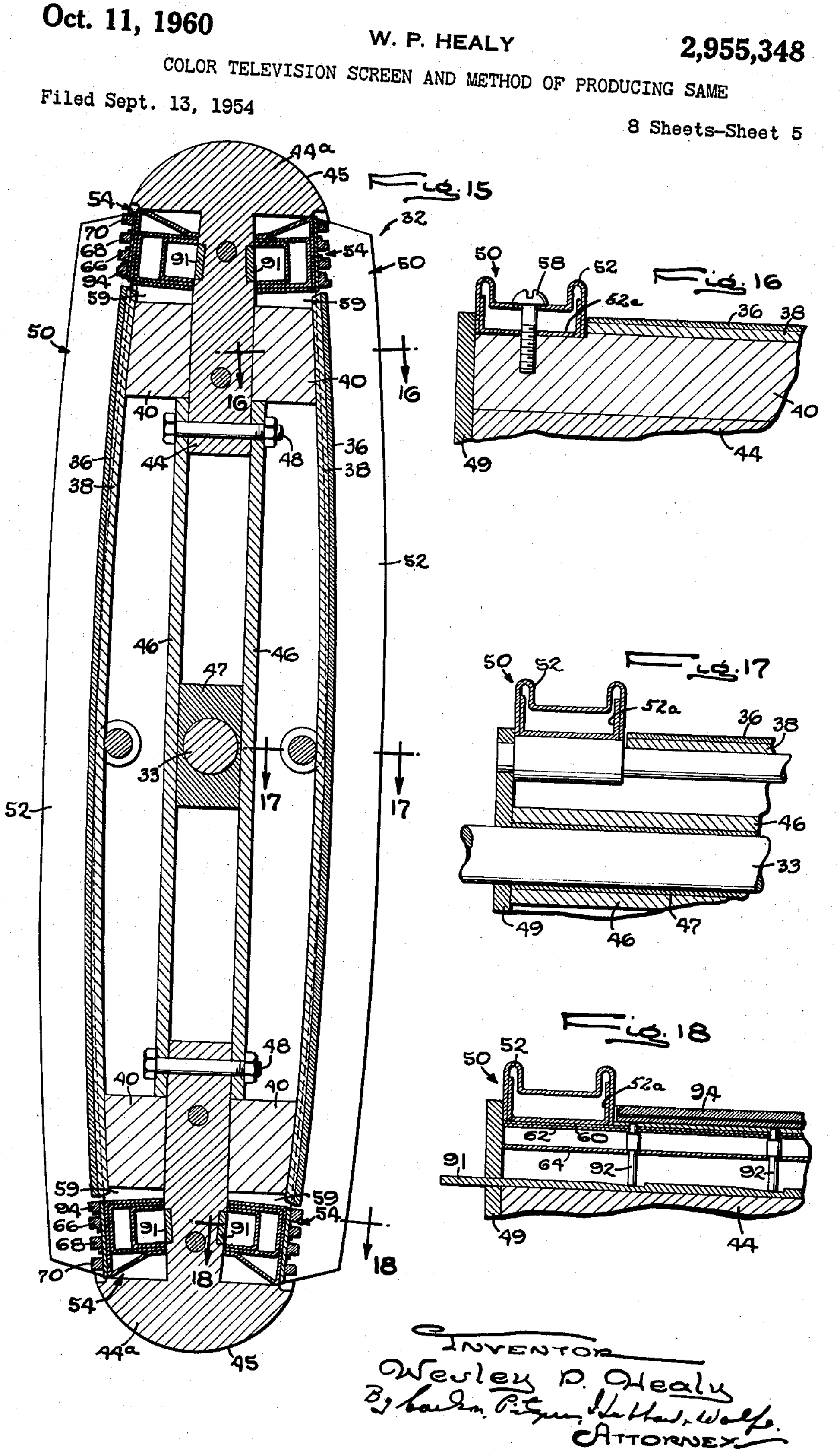
Fig. 15 is a fragmentary end elevation of a two-screen winding form which forms a part of the apparatus for practicing the instant invention.

Figs. 16, 17 and 18 are fragmentary transverse sectional views taken respectively along the lines 16—16, 17—17 and 18—18 in Fig. 15.

Figures 19, 20:
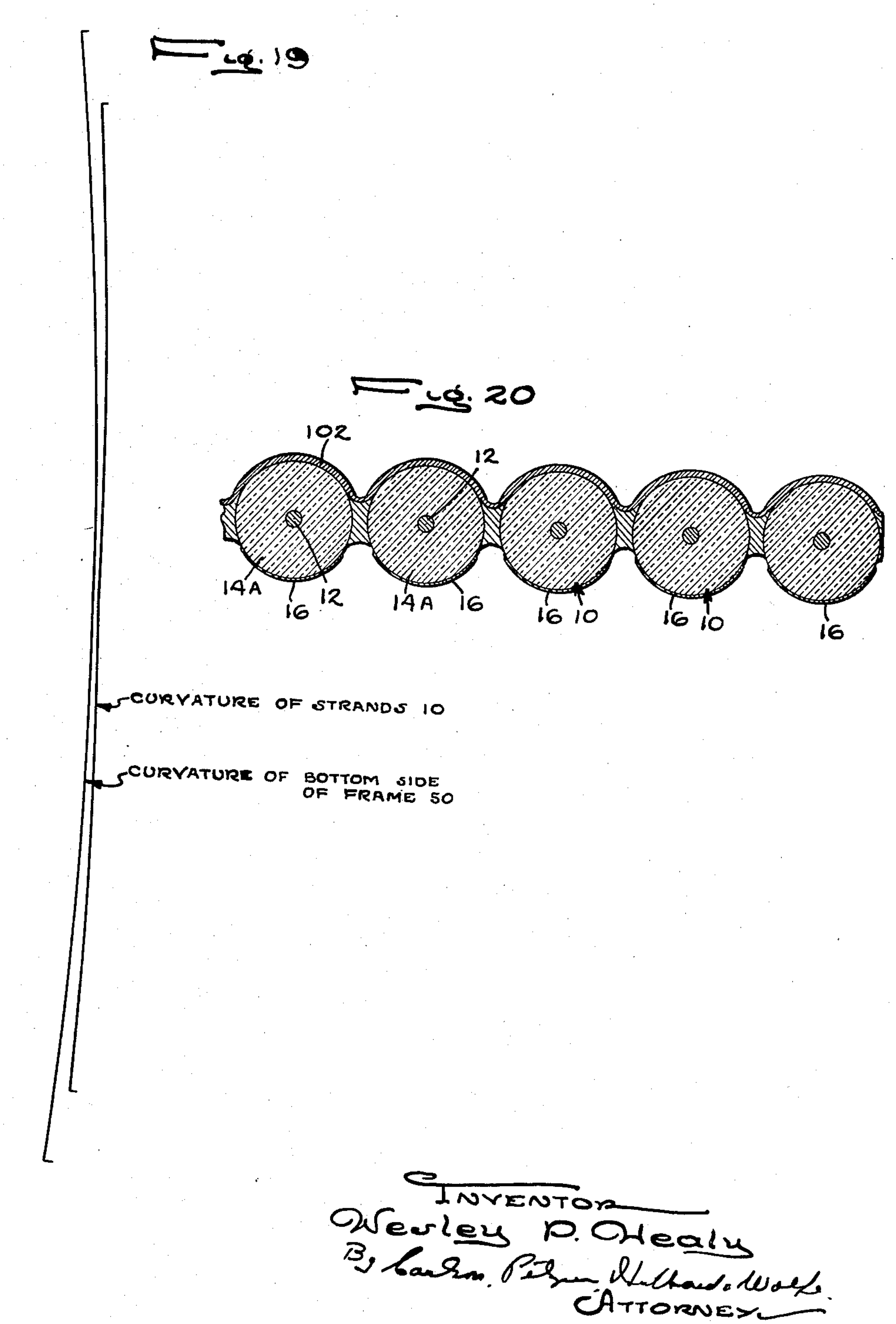

Fig. 19 is a diagrammatic representation of the relative surface curvatures of the screen supporting frame and of the composite screen when in position on the winding form.

Fig. 20 is a fragmentary transverse section through a modified form of the instant invention.

Figures 21, 22, 23, 24:
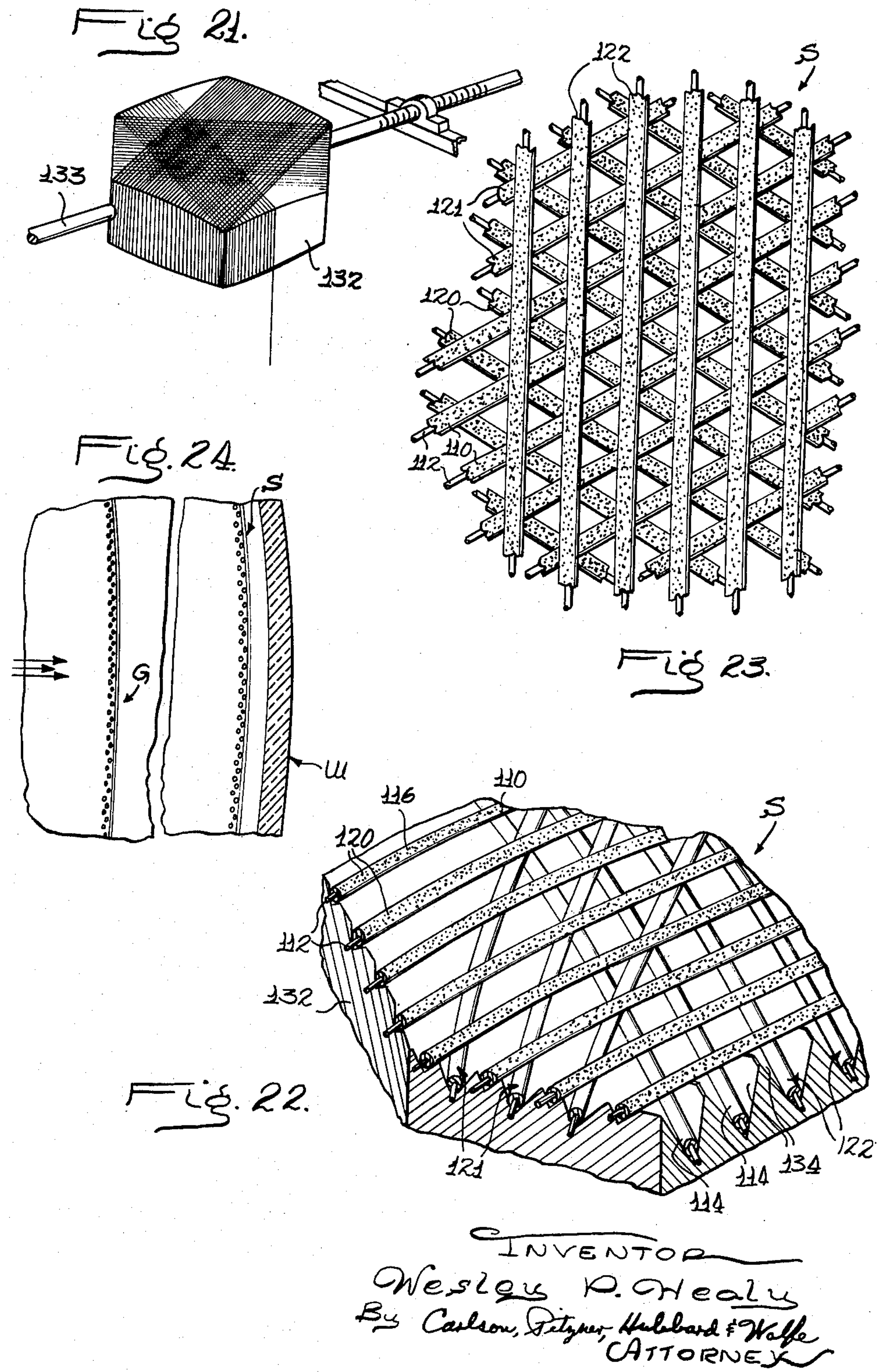

Fig. 21 is a fragmentary perspective of a winding apparatus for the lattice-form screen.

Fig. 22 is a fragmentary perspective on an enlarged scale showing portions of the winding form and strand systems of the lattice-form of the invention.

Fig. 23 is an enlarged fragmentary plan view of the lattice form.

Fig. 24 is a fragmentary section illustrating the relative arrangement of a grid and screen in a cathode-ray tube.

Figures 25, 26, 27, 28:
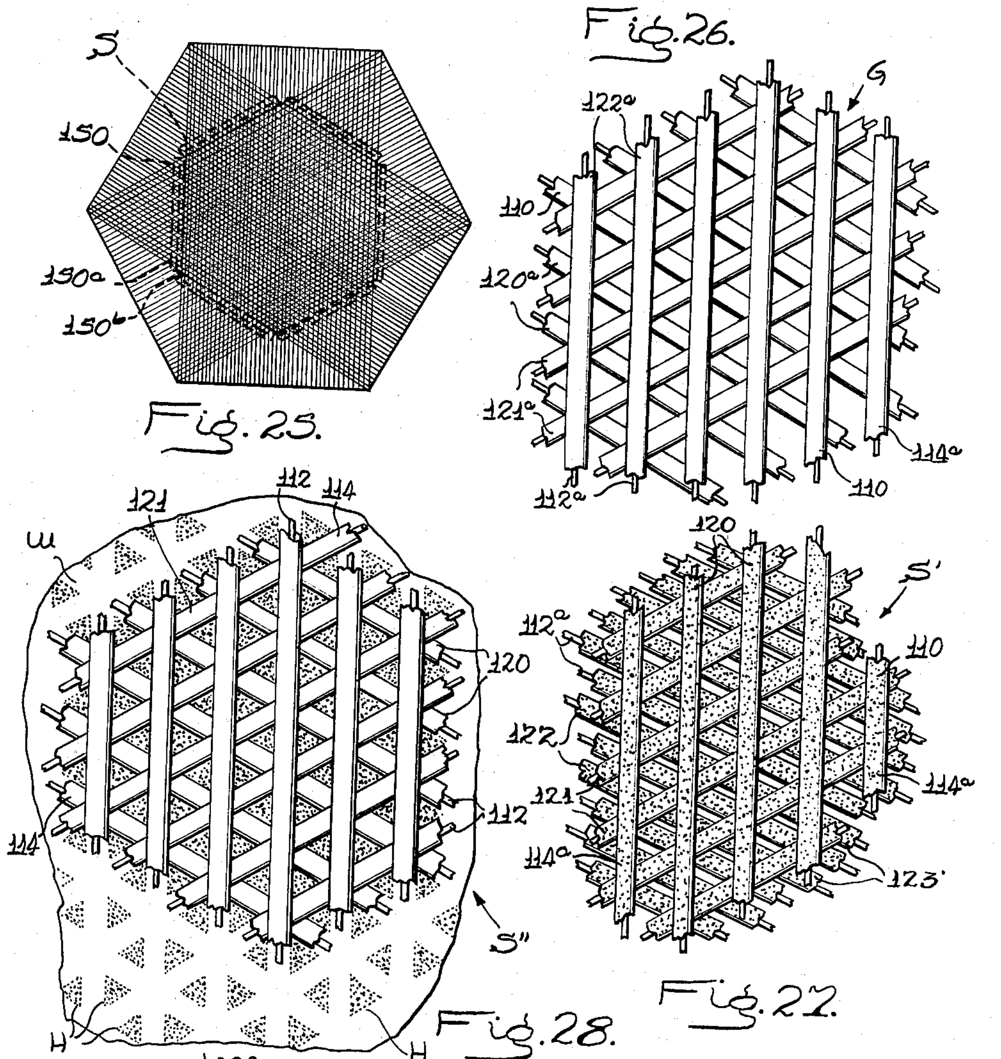

Fig. 25 is an enlarged plan view of the winding form shown in Fig. 21.

Fig. 26 is a view similar to Fig. 23 but showing a grid structure.

Fig. 27 is a view of a lattice-form screen structure incorporating an additional strand system.

Fig. 28 is a fragmentary plan view of a modified lattice-form screen.

Figure 29:
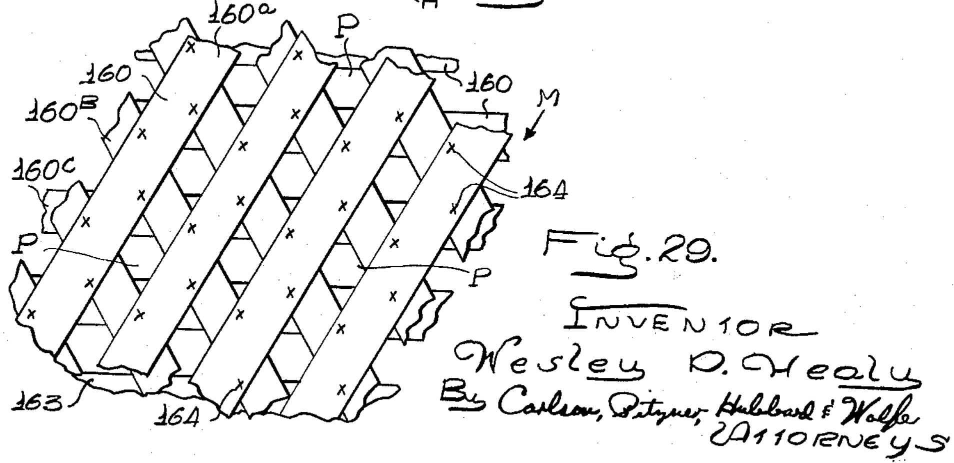

Fig. 29 is a fragmentary plan view of an apertured masking plate formed in accordance with the teachings of the present invention.

While the invention is susceptible of various modifications and alternative constructions, there are shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

Referring now to the drawings, the individual strands 10 from which the screen is to be made are of generally circular cross section and preferably include a central conducting element 12 having a translucent insulating covering 14. The term "translucent" as herein used in describing the covering 14 of the strands 10 is intended to embrace coverings of any material possessing light transmitting properties including transparent materials.

A phosphor coating 16 is applied to the outside of the covering 14.

Figures 1, 2, 3, 4:
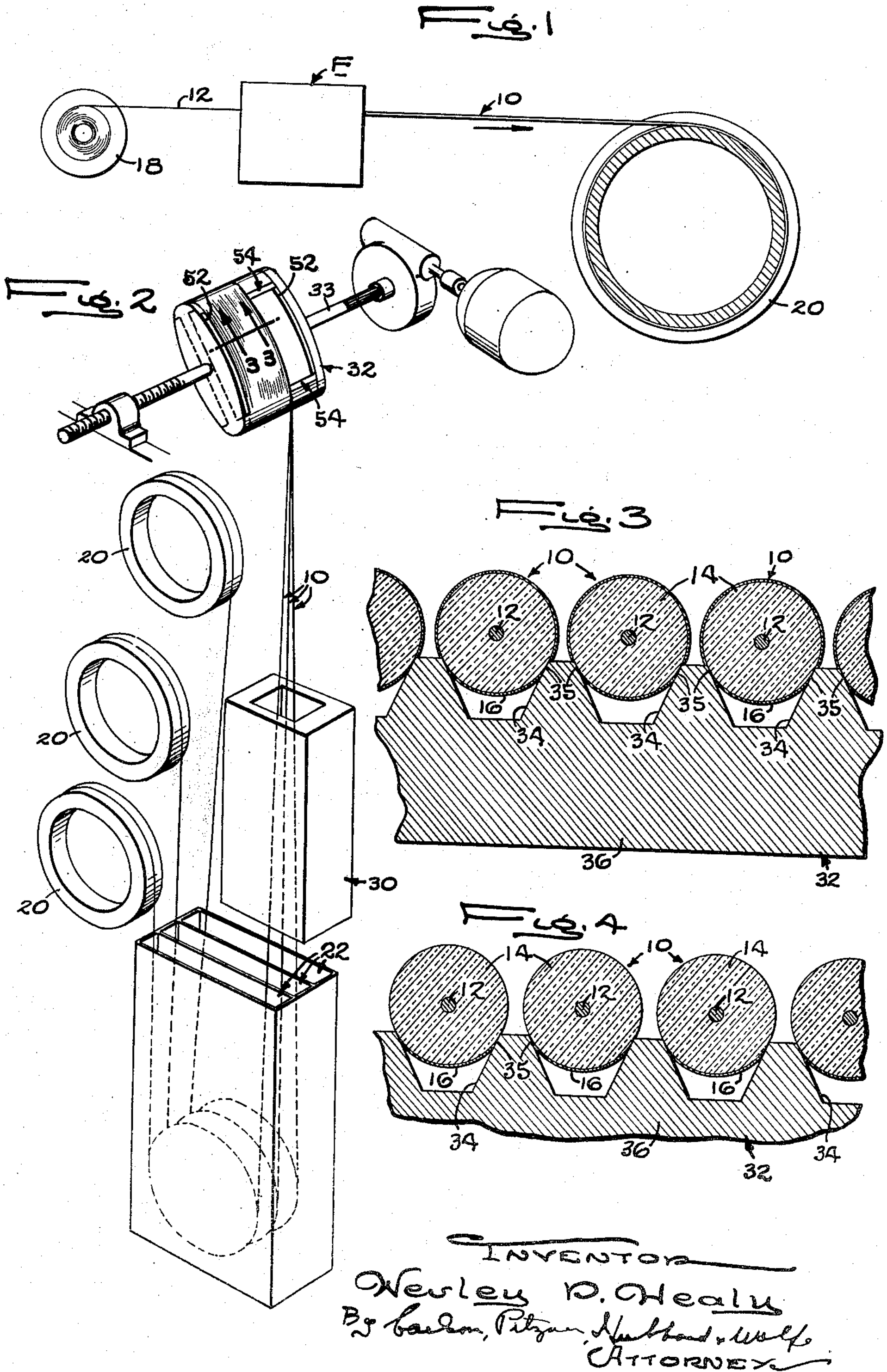
Figure 1 is a diagrammatic representation of a portion of the apparatus for making screens according to the present invention.
Fig. 2 is a fragmentary representation, partly diagrammatic in form, of another portion of the apparatus for making screens according to the present invention.
Figs. 3, 4 and 5 are fragmentary, transverse sections taken substantially in the plane of line 3—3 of Fig. 2 and illustrating various steps in making the present fluorescent screens.
Figures 5, 6:
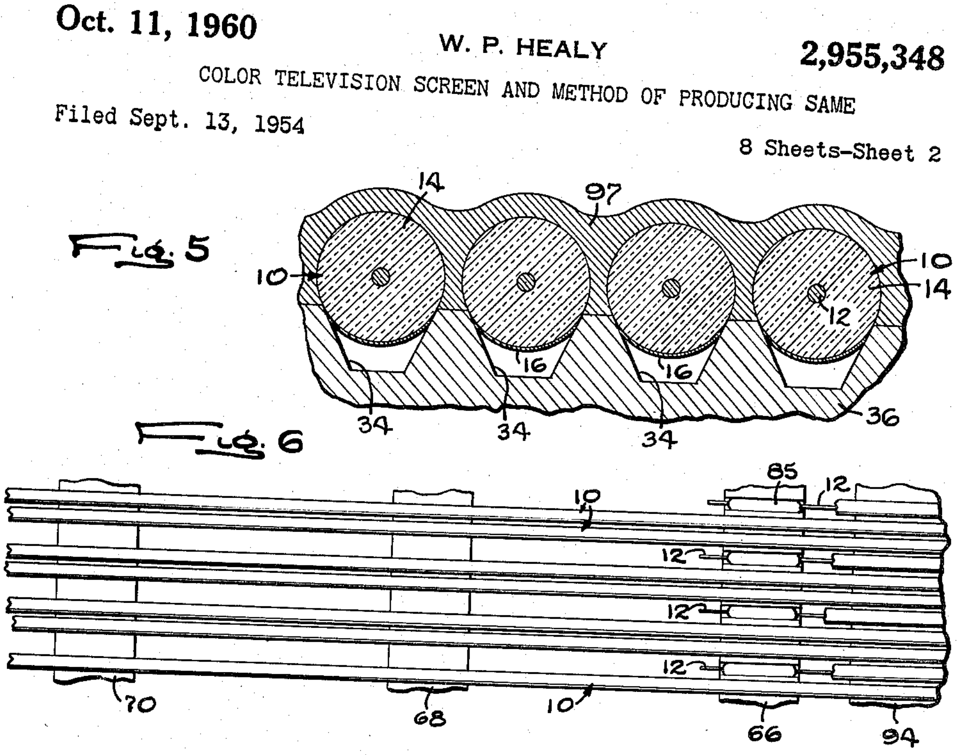
Figs. 6, 7 and 8 are similar fragmentary plan views illustrating other steps in making the instant fluorescent screens.
Figure 7:
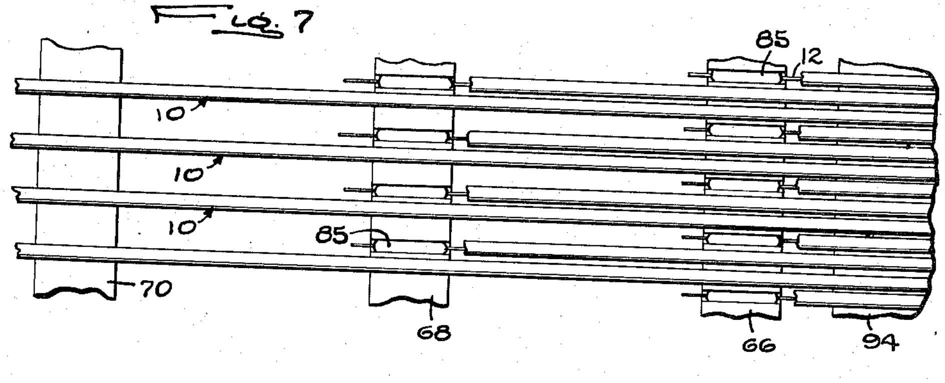
Figure 8:
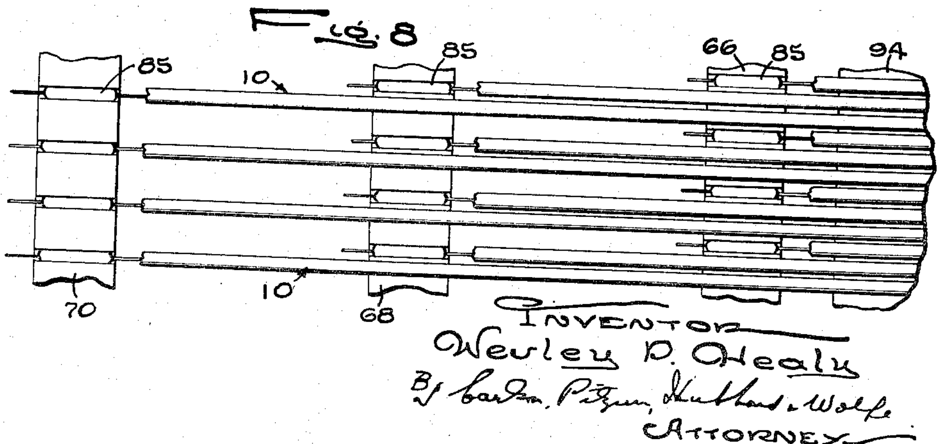
Figure 12:
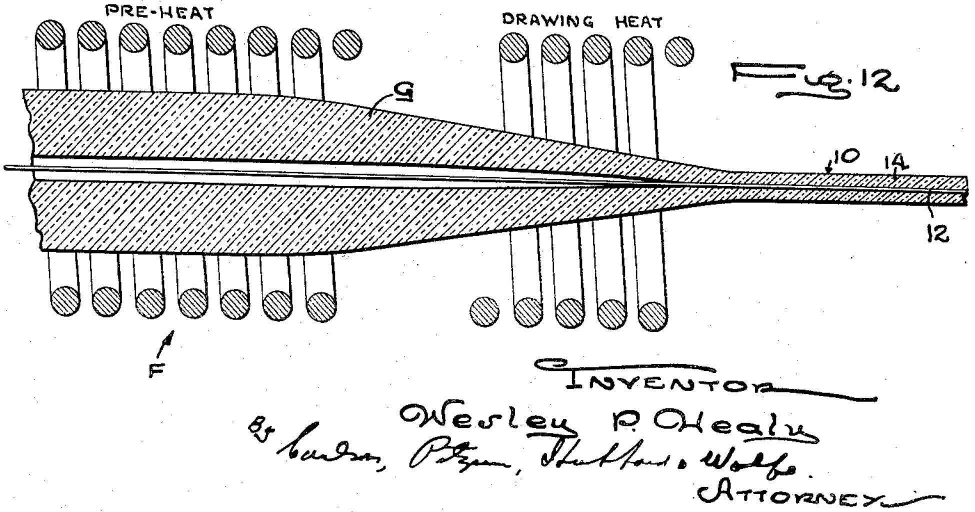
Fig. 12 is a fragmentary transverse section illustrating one way to apply the transparent covering to a central conductor in the fabrication of an individual strand for incorporation in the present screen.

The central conductor 12 should be of as small a diameter as is practicable in order to minimize screen opacity. A strand having a central conductor of .001" in diameter with a covering formed of homogeneous glass and having an outer diameter of .008" has proved satisfactory. The glass covering may be applied by passing the conductor through a plastic mass of glass G in an electric furnace F, the thickness of the glass covering being readily governed by control of furnace temperature and speed of traverse of the conductor 12 therethrough (Figs. 1 and 12). Alternatively an individual strand may comprise a central conductor with a glass covering composed of glass fiber strands. The strands make up a multi-filament yarn which is applied by winding in elongated helical form about the central conductor.

The strand preparation can be accomplished apart from the remaining steps of the process of forming the composite tricolor screens. In any event, it is desirable, after withdrawing the central conductors 12 from supply spools 18 and applying the translucent covering 14 thereto, to rewind the prepared strands 10 on spools 20 from which the strands can be used as needed.

The dimensions given in the foregoing example of the preferred form of strand, namely, one having a central conductor .001" in diameter with a glass covering worked to a final diameter of .008", having been found satisfactory from the standpoint of picture definition when incorporated in a composite screen for a so-called "twenty-four inch" cathode-ray viewing tube. For other screen sizes, that is for screens that comprise larger or smaller areas while maintaining the same number of strands, the central conductor diameter remains substantially the same, and strand diameter is increased or decreased by increasing or decreasing the thickness of the translucent covering.

It will be noted from the aforesaid dimensions that only about one-eighth of the actual physical cross section of the strand is taken up by the opaque central conductor. It is important to note, however, that because of the generally cylindrical and translucent character of the strand and because the visible radiation is produced by activation of the phosphor coating on the surface thereof, the covering acts much in the manner of a cylindrical lens to bend and direct the visible radiation from the activated coating about the central conductor. This minimizes the effect of the opaque central conductor in obstructing transmission of the visible radiation from the activated phosphor on the strand, thus enhancing visible radiation intensity.

The use of strands of the foregoing character, that is, strands having a central conductor and a translucent coating, is preferred because the central conductor permits application of a charge thereto for the control of electron beam impingement at the screen itself and also enhances the mechanical strength of not only the individual strands in the fabrication of the composite screen but also of the finished screen.

After the individual strands 10 have been provided with their glass covering 14, the phosphor coating 16 is applied thereto. While numerous methods for applying this coating are available, I preferably employ a coating made up of substantially a single layer of crystal clusters of the phosphor. This phosphor layer may be formed by passing the strands through individual baths 22 containing the desired phosphor mixtures in agitated suspension. Particularly is this method of phosphor coating desirable because it lends itself readily to the requirements of continuous mass production practices.

In the present instance, three strands 10 are withdrawn simultaneously from rewind spools 20 (Fig. 2) or from the preparation apparatus, which includes the spools 18 and furnace F, under controlled tension, and are directed to the baths 22. A separate bath 22 is, of course, provided for each of the phosphors.

From the baths 22 the coated strands 10 are passed upwardly through a drying oven 30 for the purpose of evaporating off the bath fluid and setting the phosphor coatings 16 on the strands. It must be borne in mind that the coatings are of an exceedingly fragile nature. Thus the coated strands must not come into physical contact with anything after leaving the bath solution. For this reason the drying oven 30 is preferably of vertically elongated form and disposed above the baths 22 so that the coated strands can be withdrawn directly from the baths and through the oven without the necessity for guide rollers or the like. It might be noted at this point that it is because of the fragile nature of the phosphor coatings 16 applied to the strands 10 that the tensioning referred to above is preferably effected in the strands prior to the entry of the strands into the baths 22.

The next major step in the preparation of the first of the forms of multicolor fluorescent screens is that of placing the individual phosphor coated strands 10 in closely spaced relation to each other and in repeating sequence, and to do so without disturbing the fragile phosphor coating on the strands.

This is accomplished, according to the present invention, by laying the coated strands in grooves or channels formed in the peripheral surface of a spacing and supporting form, preferably in the nature of a winding drum. For this purpose I have shown (Figs. 2–5 and 15) a rotary form 32 made of generally elliptical cross section, for a purpose presently to be described, which is supported on a spindle 33 and has contiguous peripheral grooves 34 arranged in a plurality of contiguous sets of three each, in triple spiral threaded formation. Thus three strands 10, respectively bearing the red, green, and blue fluorescing phosphors, can be applied to the form simultaneously by a simple winding operation. As hereinbefore pointed out, the shape and size of the grooves 34 and thus the strands 10 are so correlated that the strands do not bottom therein. As shown, the strands 10 contact the groove walls only adjacent the tops thereof as at 35, so that the upper strand surfaces project above the surface of the supporting form 32.

The grooves 34 for the reception of strands of the foregoing exemplary dimension, i.e., an outer diameter of .008″, are preferably of a width of .0065″ adjacent the tops thereof, i.e., between the points where they are engaged by the strands, and such points on adjacent grooves are spaced apart a distance of .0025″. A satisfactory groove depth is .004″. Thus if the supporting form 32 is provided with spiral thread grooves such threads will have a distance between similar points on adjacent threads of .009″. It has been found preferable that grooves with the foregoing dimensions be shaped to have a side wall slope, i.e., the included angle, of approximately 50°, and that they be spaced apart to provide a land or table .0025″ in width between adjacent grooves. However, the depth of the grooves and the angle of slope between the side walls thereof are not critical, save that the strands when placed therein preferably do not bottom in the grooves. It will be apparent, therefore, that when the strands 10 are wound on the supporting form 32, maintenance of suitable tension on the strands 10 causes them to be drawn down tight against the walls of the grooves 34, and the latter serve not only to properly space and support the strands but at the same time protect the phosphor coatings 16 on the inner surfaces thereof.

While the actual shape and size of the supporting form 32 may be altered, depending primarily on the size and number of screens to be simultaneously made, the illustrative supporting form comprises what might be termed a two-screen form. The generally elliptical cross-sectional shape of the exemplary form 32 provides convex surfaces over which the strands are wound. As may best be seen in Fig. 15, the exemplary winding and supporting form 32 includes face plates 36 in which the screen strand receiving grooves 34 are formed and a central supporting structure for the plates. More particularly, the central supporting structure includes a pair of relatively thick mounting plates 38 which serve as backing plates for the face plates 36 and which are fastened at their opposite ends to transverse end blocks 40. The transverse end blocks 40 are, in turn, fixed on opposite sides of and intermediate the ends of the legs of generally T-shaped end members 44. The latter have arcuate outer faces 45 which are also grooved in the same manner as the face plates 36. The T-shaped end members 44 are held in spaced relation by a mounting frame comprising a pair of spaced parallel plates 46 disposed on opposite sides of and rigid with a central journal or sleeve bearing 47. The latter is adapted to receive the spindle 33 for rotatably supporting the entire form 32. The inner ends of legs of the end members 44 are received between the outer extremities of the plates 46 where they are fastened as by screws 48. Side plates 49 (Figs. 16–18) are provided to cover the ends of the form and enclose the central supporting structure.

In view of necessary temperature considerations, hereinafter more fully discussed, it is desirable that certain portions of the winding and supporting form 32 be fashioned of materials having an exceedingly low temperature coefficient of linear expansion. Suitable alloys are readily available (e.g., Invar or Covar) which, within the temperature range to which the supporting form may be subjected, have a linear expansion in the range $4\times10^{-6}$ to $8\times10^{-6}$ of an inch of length per degree Fahrenheit. Since a certain amount of tension longitudinally of the strands 10 is desirable, dimension changes transversely thereof only need be considered because of the effect of linear expansion on strand spacing. A change in strand spacing obviously alters their positions relative to the electron gun and beam deflecting means of the cathode-ray tube in which the composite tricolor screen is incorporated. In view of this the face plates 36 and the end members 44 of the exemplary supporting form 32 are fashioned of material of this character.

The grooved face plates 36 of the winding and supporting form 32 are fastened to the backing plates 38 only along the longitudinal center lines thereof. Thus any relative changes of transverse dimensions between the plates 36 and the plates 38 due to temperature changes and differences of materials take place relative to that line.

It is important to note that the end members 44 of the supporting form serve to space apart the adjacent ends of the screens formed on the opposite sides of the form 32. This construction, therefore, provides adequate space for accommodation of a splice which might be necessitated should one of the strands break during the winding operation. In other words, if a break in one of the strands should occur during the application of the strands to the supporting form, the operator of the apparatus merely has to stop the winding operation and take the broken strand back to the end piece and there form a splice. Increased strand thickness or lateral strand shift due to the splice, therefore, will not be manifested in the actual fluorescent screen area and thus there will be no irregularity in such area.

To insure maintenance of a perfectly horizontal parallel strand arrangement in the finished screen so that there is activation of the phosphor of the preselected strand system as the electron beam traverses the screen, it is desirable that the strands be longitudinally tensioned. A shift in strand position, as would be caused if there should be even a slight sag in the screen after it was installed in the cathode-ray tube would cause adjacent strands of one system or another to droop into the positions properly occupied by the strands of the system then being activated in response to reception of a transmitted signal for a particular elemental picture. Thus that portion of their phosphors would be activated with the resultant production of an imperfect composite picture. Such longitudinal tensioning is attained in the present instance by means of a frame 50 initially comprising a portion of the form 32 and to which the composite tricolor screen is permanently attached.

Preferably, the frames 50 are pre-formed from sheet material and the elements thereof are welded together so as to attain and maintain exact relative positions. Each individual frame includes spaced longitudinal side rails 52 between the ends of which are fixed transverse end members 54. The upper surfaces of the transverse end members 54 are disposed below the plane of the strand layer that is to be wound thereover and are adapted to have the strands of the composite screen attached thereto. The longitudinal side rails 52 are formed so that upon flexing, a neutral surface (according to the ordinary theory of bending beams) is manifested somewhat above the plane of the strand layer. For this purpose each of the side rails 52, as shown, is fashioned of sheet material bent so as to be of generally I-shaped cross section. Adjacent their ends and also centrally thereof the side rails have short, inverted, channel-shaped braces **52*a* rigid therewith for strengthening them. This form of side rail has been found satisfactory in operation and at the same time minimizes the quantity and weight of material required. Upon attaching the frames to the supporting form, the ends thereof are flexed downwardly with respect to their centers, the convex outer surfaces of the supporting form 32 being designed to a radius such that the longitudinal side rails 52** of the frames will be bowed an amount not to exceed the limits of elasticity thereof.

In the present instance, two frames 50 are secured to the winding and supporting form 32 prior to the application of the strands 10 thereto, as by screws 58 (Fig. 16). The transverse end blocks 40 are spaced from the crossbars **44*a* of the I-shaped end members 44 so as to provide recesses as indicated at 59 and for the reception of the end members 54 of the frames 50. When the strands 10 are laid over and secured to the end members 54 of the supporting frames 50, and the composite screens are finally completed, release of the frames from the supporting form 32 permits them to return to normal flat condition. In so doing, since the strand sheets or screens when wound occupied planes below the neutral planes of the frames 50**, the sheet and the strands comprising the same are tensioned slightly.

Since the strand sheets are maintained under tension, the end members 54 of the frames must be of adequate strength so as to preclude bowing which would result in sheet sag and thus in a transverse strand shift. To provide such strength and at the same time to minimize the amount of material required, each of the end members is preferably of laminated form. Further, to minimize transverse strand shift due to temperature variation, the sheet material employed is preferably of an alloy, like that previously described for use in the supporting form 32, possessing an extremely low temperature coefficient of linear expansion. While the frame end member structure can be fashioned in any appropriate manner, the illustrative embodiment (Fig. 13) includes three inverted and interfitted generally channel-shaped elements 60, 62 and 64, respectively, which are welded together into a unitary structure and provide a horizontal top surface and a vertical front or "screen-side" surface.

The flat top surfaces of the supporting frame end members 54 conveniently serve to support terminal strips 66, 68 and 70 for connecting a voltage source to the central conducting elements 12 of the phosphor coated strands 10 when strands of such character are employed. Further, the terminal strips can, as in the present instance, serve in addition as anchoring means for the strands and thus eliminate necessity for any auxiliary devices for this purpose. In this connection, it is to be noted that the central conducting members of the strands are to be alternately charged positively or negatively in accordance with the elemental picture being reproduced in order to control electron beam impingement. Therefore the conductors and the terminal strips to which they are attached must be insulated from each other. As previously noted, the translucent covering 14 provides adequate insulation between adjacent strands in the screen itself. Thus it is required only that the terminal strips be insulated from each other and that the central conductors of each independent strand system be insulated from the terminal strips of the other strand system and from the central conductors of such other strand systems.

Each of the terminal strips 66, 68 and 70 is of generally elongated form and of rectangular cross section having its top surface grooved for the reception of the strands 10 in substantially the same manner as the face plates 36 and end members 44 that comprise the surface of the supporting and winding form 32. To the individual strips 66, 68 and 70, however, are respectively connected the central conductors 12 of the strands of only one of the independent strand systems. Furthermore, it is desirable that there be no electrical contact at all between the individual terminal strips 66, 68 and 70 and the strands 10 of the independent systems which are to be attached to the other terminal strips. To this end, portions of the strips are cut away (Figs. 13, 14) so as to leave upstanding ribs 66a, **68*a* and 70*a* and in the ribs are formed grooves 66*b*, 68*b* and 70*b*** for the reception of every third strand of the screen. That is to say, each terminal strip has grooves therein for the reception of the strands of only the system for which it is to serve as an electrical connection.

In the present embodiment, the terminal strips 66, 68 and 70 are supported on but are insulated from mounting strips 74, 76 and 78. Interposed between the terminal strips and the mounting strips are thin strips or layers 80, 82 and 84 of insulating material such, for example, as mica. Preferably, the terminal strips are riveted to the respective mica layers which in turn are riveted to the mounting strips.

Figure 13:
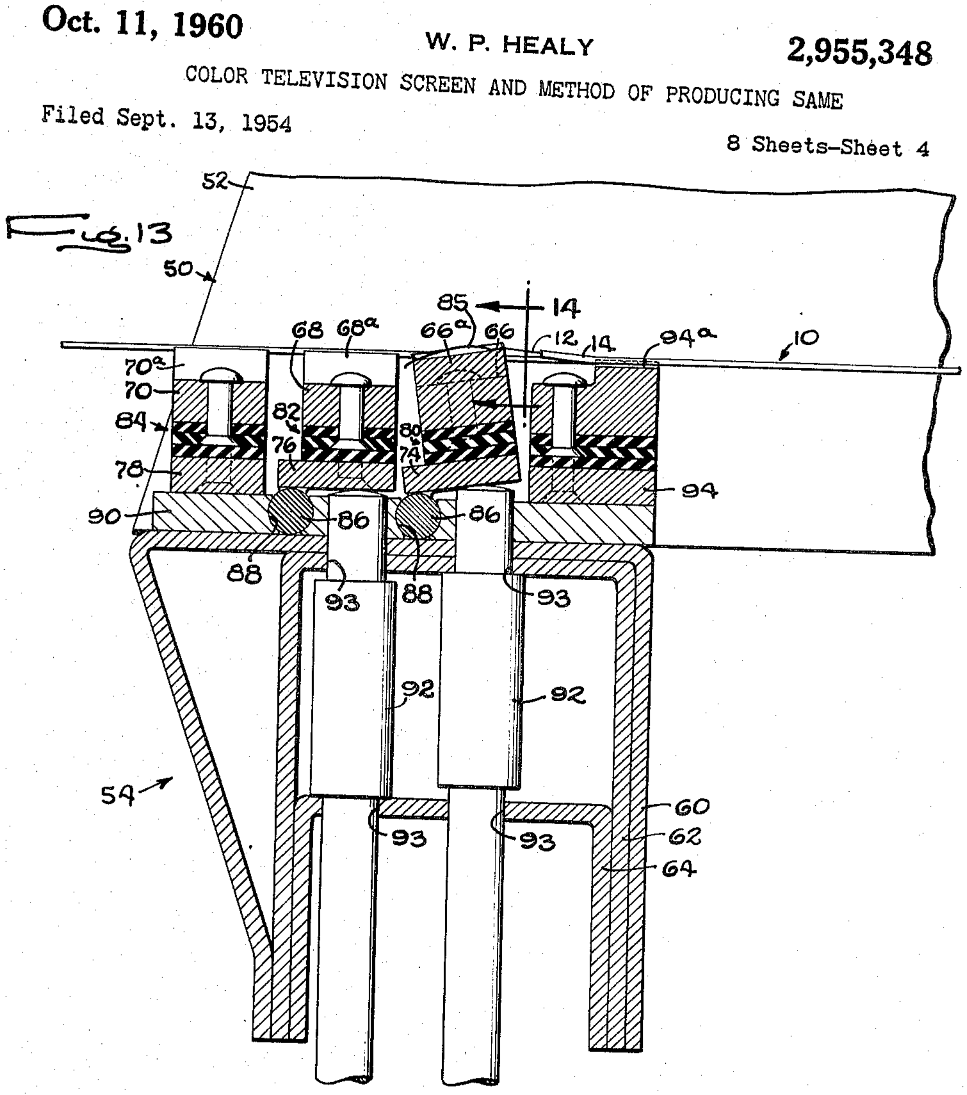
Fig. 13 is a fragmentary transverse section taken substantially in the plane of line 13—13 in Fig. 9.
Figure 14:
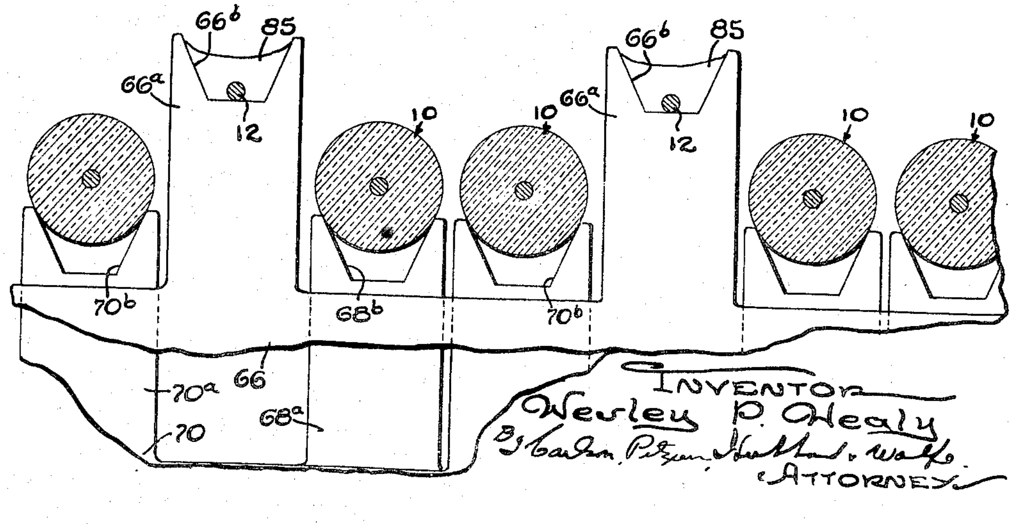
Fig. 14 is a fragmentary view taken substantially in the plane of line 14—14 in Fig. 13.

In order to facilitate connection of the central conducting members 12 of the strands 10 of each of the independent strand systems to the respective terminal strips therefor, the front and intermediate terminal strips 66 and 68, respectively, are mounted so that each can be pivoted about an axis extending along its rear edge and thereby have its forward edge raised (Fig. 13). This construction permits the ribs **66*a* and 68*a* to be raised upwardly above the plane of the screen. The strands received in the grooves 66*b*, 68*b* or 70*b* of such ribs will thus be raised above the plane of the other strands. In such position a suitable tool (not shown) such, for example, as one in the nature of a dental burr can be passed over the strands and along the upraised rib to remove the translucent insulating covering 14 from the central conductor 12 thereof. With the insulating covering 14 removed, and the terminal strip still in upraised position, the central conducting members 12 can then readily be soldered, as indicated at 85 in Fig. 14, in the grooves of the terminal strip rib. Referring particularly to Figs. 13, 6, 7 and 8, after connection is made between the first terminal strip 66 and the conductors 12 of the strands 10 which it serves, it is then returned to normal position. Thereafter the intermediate terminal strip 68 is raised and electrical connection between it and the central conductors of the strands of the system which it serves is made thereto. Before returning the forward and intermediate terminal strips to normal position and after connection of the central conducting members thereto has been made, the trailing strand portions are cut off immediately behind the ribs of the respective terminal strips. It will be apparent, therefore, that only the strands of the third system pass over the rearmost terminal strip 70. Thus there is no necessity for pivoting the rearmost strip, and it is made rigid with the upper surface of the transverse end member 54 of the supporting frame 50**.

In the present instance the means provided for pivoting the forward and intermediate terminal strips 66 and 68, respectively, includes transverse rods 86 which may be riveted or otherwise fixed along the lower rear edges of the mounting strips 74 and 76. The rods 86 are received in hinge slots 88 formed on the upper surface of the end members 54 of the supporting frames 50. As shown, the slots 88 are defined by appropriately grinding and spacing anchoring strips 90 which are fixed directly to the top surface of the end member 54. The slots 88 are of substantially circular cross section so as to receive and hold the rods 86 but are open at their tops to accommodate the means by which the mounting strips 74 and 76 and the rods 86 are secured together, and to permit limited swinging movement thereof.

To rock the terminal strips 66 and 68 about the axes defined by the rods 86, push pins 92 are provided which engage the undersides of the mounting strips 74 and 76 adjacent the forward edges thereof (Figs. 13 and 18). The push pins 92 are received in guide passages 93 formed in the webs of the channel elements 60, 62 and 64 of the end members 54 and in the anchoring strips 90. The push pins 92 can be shifted axially in the guide passages 93 by any suitable means such as transversely shiftable cam bars 91 (Fig. 18) carried on the supporting form 32.

In order to assist in the maintenance of transverse strand position, a guide bar 94 is provided along the forward edges of the transverse end members 54 of the supporting frame 50. The guide bar 94 is fixed to the transverse end member 54 forwardly of the forward terminal strip 66. This bar has a complete set of strand receiving grooves *94a* formed therein corresponding in number, size, shape and alinement with the grooves 34 in the face plates 36.

While the foregoing comprises a description of only one of the supporting frame's transverse end members, the other is identical therewith and this description will serve equally well for it. No means has been illustrated for providing an electrical connection between individual terminal strips 66, 68 and 70 and a voltage source for charging the central conductors 12 of the strands 10 connected thereto. However, it will be obvious to one skilled in the art that such connection can be readily made as by the provision of suitable conductors between the terminal strips and connecting elements of the type commonly called "anode buttons" (not shown) secured in the envelope of the cathode-ray tube in which the screen is incorporated.

It is to be noted that the frame 50 serves the additional purposes of facilitating handling of individual screens and of accommodating fastening means, such as mounting lugs 96, for mounting the completed screens within the envelopes of cathode-ray tubes in which they are to be installed.

After the central conductors 12 have been attached to the terminal strips 66, 68 and 70, and either before or after removal of the individual screens from the winding and supporting form 32, as desired, the screens are subjected to treatment in a vacuum oven (not shown) in order to permanently set the cement that binds the independent strand systems into sheetlike form and to drive off any occluded gas and gas forming materials that might be found in the screen.

By way of summary, the method of making multicolor screens according to the preferred form of the present invention may be restated briefly as follows: First, the strands 10, one for each of the desired phosphors, are withdrawn from their spools 20 and passed respectively through baths 22 containing the phosphors in agitated suspension so as to coat the same with phosphor. From the baths 22 the coated strands 10 are drawn through an oven 30 to drive off the bath fluid and fix the phosphor coatings 16 to the translucent covering 14 of the individual strands 10. After passing through the drying oven 30, the coated strands are simultaneously wound in adjacent grooves 34 on the spacing and supporting form 32. Care must be taken to insure that there is no physical contact with the strands 10 after they leave the coating baths 22 and are applied to the supporting form 32.

As previously pointed out, the grooves 34 in the form 32 are so fashioned that they are of a maximum width slightly less than the outer diameter of the strands 10 and are of a depth greater than the amount of strand that extends into them in order that the strands do not bottom in the grooves (Fig. 4). Such construction serves to protect the phosphor coating on the undersides of the strands. Additionally, the lands or tables between adjacent grooves on the form 16 are of sufficient width to space adjacent strands apart.

Prior to the winding operation, supporting frames 50 for the composite screens are put in place on the supporting form 32. These frames, each including transverse end members 54 and side rails 52 are flexed to conform to the contour of the supporting form so as to effect tensioning of the strands 10 upon their attachment to the frames 50 and release of the latter from flexed condition on the form 32.

With the strands 10 laid in the grooves 34 across the entire surface of the supporting form 32, their exposed surfaces may then, if desired, be wiped clean of the phosphor coating 16 (Fig. 4). Thereafter, a coating of cement 97 (Fig. 5) is applied to the clean exposed surfaces of the strands. This cement 97 may be either a silicone-resinous cement or finely powdered glass of low melting temperature, preferably in a fluid suspension, or of potassium oxide ($K_2O$), silica ($SiO_2$), and a soluble salt dehydrating agent. (The latter binder is commercially available under the name Kasil.) The cement may be applied in any suitable manner as by wiping, spraying or brushing, care being taken to insure that a substantially uniform coating of the cement is put on. The cement, by ordinary capillary action, tends to be drawn into the spaces between adjacent strands and thus serves to fasten the strands together in sheetlike form.

After cementing has been accomplished, the central conductors 12 of the strand systems are then alternately attached to the respective transverse terminal strips 66, 68 and 70 as by soldering. Thereafter the ends of the strands 10 trailing beyond the terminal strips are removed. If desired, the step of attaching the conductors 12 to the terminal strips can be accomplished prior to the application of the cement 97 as above described.

Figure 10:
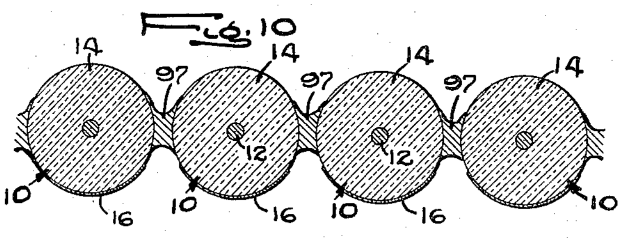
Fig. 10 is a fragmentary transverse section taken substantially in the line 10—10 in Fig. 9.

Subsequent to the winding, cementing and soldering steps, the composite screens, then fixed to their supporting frames 50, are placed in a vacuum oven (not shown) for treatment to set the cement and remove any occluded gas and gas-forming materials. Vacuum oven treatment reduces the volume of the cement 97 and capillary action between adjacent strands 10 causes the cement to be drawn down between the strands so as to comprise small "connecting links" or bonds between them (Fig. 10).

It has been previously proposed that multicolor screens be composed of lines of phosphors, the same being sequentially positioned by stacking of phosphor-bearing elements or by physically depositing the phosphors in lines or bands in contiguous relation to each other. It is obviously impractical, indeed practically impossible, to so obtain accurate phosphor line positioning. This is obviated by the practice of the present invention. With the phosphors being borne by individual strands each phosphor is confined to the surface thereof, and when the strands are incorporated in a screen they are accurately positioned in spaced relation to each other. The spaces between adjacent strands, of course, comprise but a minor fraction of the screen area, but nevertheless these spaces allow for the absorption of strand diameter variations without displacement of the phosphor line or of adjacent strands and the phosphor lines defined thereby.

Figure 9:
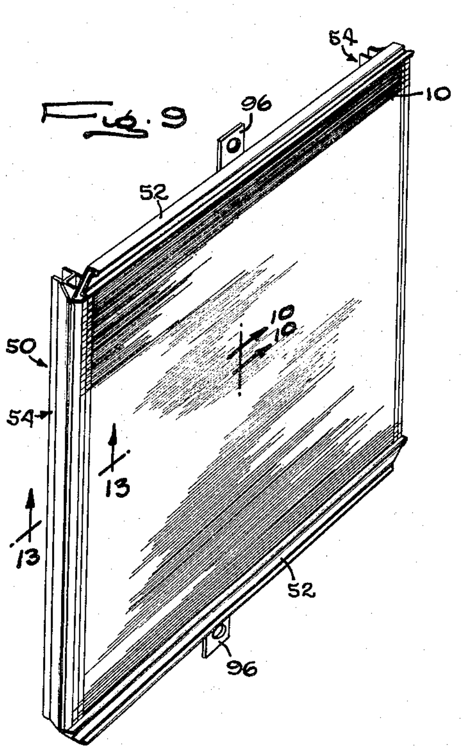
Fig. 9 is a perspective view of a screen embodying the present invention.
Figure 11:
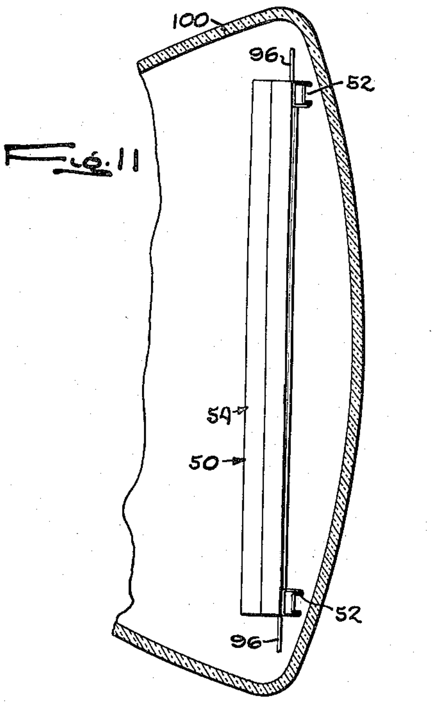
Fig. 11 is a fragmentary side elevation showing the position of the instant screen in a cathode-ray tube envelope.

Each composite screen thus formed (Fig. 9) and comprising the sequentially arranged systems of strands 10 cemented together, and providing a composite tricolor phosphor line pattern, fixed in its supporting frame 50 and having the insulated terminal strips 66, 68 and 70 connected to the central conductors 12 of the individual strands 10 of the respective systems is ready for incorporation in a cathode-ray tube envelope 100 adjacent the viewing end of the tube (Fig. 11). The tricolor phosphor line pattern is disposed only on one side of the screen and that side is disposed for direct impingement by the electron beam of the tube, the cemented side of the screen being placed adjacent the glass of the viewing end of the tube. Suitable supporting means such as the lugs 96 for holding the screen in place can be provided and suitable connections (not shown) for applying the charging voltages to the central conductors 12 of the strands can be made to the terminal strips.

It will be noted that in such an arrangement with a screen of the above character the direct impingement of the electron beam on the phosphor coating is susceptible of accurate control by proper alternate charging of the conductors of the strand systems. This feature together with the close spacing of the phosphor lines afforded by the strand structure enchances definition of a picture reproduced thereon. The cylindrical translucent nature of the insulating coverings 22 on the individual strands 10 bends the visible radiation from the activated phosphor coatings 16 thereon about the central conductors 12 thus minimizing the effect of actual opacity due to the amount of screen area taken up by the conductors 12. Furthermore, since there preferably is but a single activated layer 16 of the phosphors on the screen, visible radiation intensity is further enhanced since visible radiation is not impeded by unactivated phosphor layers. It is to be noted, however, that satisfactory results obtain even if the phosphor coating is not removed from one side of the screen.

As is well known to those skilled in the art, continued exposure of fluorescent screens to the impingement of an electron beam results in deterioration thereof. With conventional cathode-ray tubes, when deterioration has become pronounced, the tube is ordinarily discarded. Recently, however, because of the relatively high costs of other elements of the cathode-ray tubes and because of a shortage of materials, it has been found desirable to salvage the tubes by opening the envelopes, removing the deteriorated elements including the fluorescent screens and replacing them. Screen material can readily be replaced in the case of ordinary monocolor screens by simply wiping off the old and depositing the new on the inner face of the glass viewing end of the tube. It is at once apparent, however, that currently proposed tricolor screens do not permit of such rejuvenation. Tricolor screens made in accordance wtih the teachings of the present invention, however, lend themselves readily to this general idea of salvage and replacement with but simple modification of the basic teachings.

For this purpose, as shown in Fig. 20, the individual strands can be formed of a central conductor 12 having a covering of glass 14A which has the property of transmitting radiation in the ultraviolet range, for example, radiation having a wavelength on the order of 3650 Angstrom units. Phosphors fluorescing the desired red, blue and green colors are available that are also susceptible of activation by radiation of this wavelength. Strands with coverings of such glass and coated with such phosphors are wound on the supporting form, their exposed surfaces cleaned of the phosphor coatings, their central conductors connected to the terminal strips of the supporting frames and the strands cemented together into composite sheet form, in the same manner as previously described herein. After vacuum oven treatment to set the cement, a coating 102 of a phosphor which, upon impingement by an electron beam, is activated to produce radiation of the afore-mentioned 3650 Angstrom units wavelength is then placed on the side of the sheet opposite the color-fluorescing phosphor coatings 16. Upon installation of a screen formed in this manner, the side bearing the color-fluorescing phosphors is placed adjacent the glass window in the viewing end of the tube and the phosphor which produces the radiation of a wavelength of 3650 Angstrom units is exposed for direct impingement by the cathode-ray beam from the electron gun of the tube.

When, after a period of time, deterioration of the phosphor coating 102 becomes pronounced, the cathode-ray tube envelope can be opened, the deteriorated coating removed and replaced. The tricolor coating 16 on the opposite side of the screen is left undisturbed.

Still another advantage flows from a tricolor screen formed in accordance with the teachings of the present invention. Considerable difficulty has been experienced in obtaining phosphors which will fluoresce true primary colors so that when combined, faithfully produce a true-color picture. This difficulty can be readily overcome in the instant screen by properly tinting the glass coverings 14 of the individual strands. That is to say, in order to produce a true primary color, the glass coverings 14 of the strands 10 of the strand system for that color can be properly tinted so as to compensate for the difference between the wavelengths of the visible radiation from the activated phosphor coatings 16 thereon and the desired primary color.

It will also be apparent that the glass coverings of the individual strand systems can be tinted exactly to the primary colors themselves. With such coloring of the glass coverings of the strands, then a white fluorescing phosphor coating is placed thereon with the result that the effect of a tricolor screen is had. While full color tinting is not as advantageous as compensating tinting, as above set forth, in that the intensity of radiation or brightness of the picture reproduced is somewhat reduced, nevertheless the elemental pictures sequentially reproduced on such a screen are properly positioned for combination into a composite full color picture and are of the exact colors desired.

In the foregoing description of the tricolor screen and the method of making the same, it was set forth that after the individual strands are applied to the winding form 32, the strands are cemented together into composite sheetlike form. It may be desirable, however, in some applications not to employ a conventional cement for fastening the individual strands together into a composite sheet. In such a case the glass coverings 14, themselves, of the strands 10 can be, upon properly controlled heat treatment, caused to flow and adhere together. Alternatively, and as hereinbefore noted, in place of a cement coating as previously described, finely powdered glass can be applied, as by dusting or by coating the exposed surfaces of the strands with the finely powdered glass in fluid suspension when the strands are in place on the winding form 32. Preferably, this powdered glass is of a type having a melting temperature lower than that of the glass strand coverings 14 but having a similar coefficient of thermal expansion. Such glass powder is commercially available. Upon proper heat treatment, this powdered glass behaves substantially in the same manner as the cement, i.e., it fuses and flows between adjacent strands to bond them together into sheet form. The resulting screen will possess an identical appearance as the cemented screen and as indicated in Fig. 10.

It has recently been determined to be advantageous that multicolor screens for certain application be formed of elemental areas each of which includes phosphors fluorescing, when activated, each of the basic colors to be reproduced. One of such screens comprises dots of the phosphors deposited on a transparent plate in a triangular arrangement by a process similar to silk-screen printing in that a screen or mask, which is foraminated by etching, is utilized to dictate the positions of the dots of the individual phosphors, the same mask being cleaned and relocated after the depositing of each phosphor. This mask is ultimately mounted in spaced relation to the screen thus formed to assist in the control of electron beam impingement. This is obviously a laborious and, at best, an inaccurate process. These individual screens embody phosphor dots of varying sizes not always exactly located, and mask and screen combinations, or "color-packs," are of exceedingly low visible-radiation efficiency.

The foregoing disadvantages are obviated by the present invention. In Fig. 21, et seq., are shown screens embodying the teachings of this invention and being formed to define elemental areas incorporating each of the phosphors. As in the previously described line-type screen, the instant screens comprise a plurality of independent strand systems, each system consisting of spaced, parallel strands 110, with individual strands being composed of a central conductor 112 bearing a translucent, insulating covering 114 coated with a phosphor 116 fluorescing a desired color. These strands can be formed and coated in the same manner as hereinbefore set forth. In this form of screen, however, the strand systems are angularly arranged with respect to each other so as to form a lattice having openings therein each of which is partially bordered by a segment 110' of a strand of each system. There are thus defined elemental screen areas each incorporating each of the phosphors.

The illustrative screen S (Figs. 21–25) includes three strand systems 120, 121, and 122: one for each of the phosphors fluorescing the desired basic colors, e.g., red, blue, and green. Since a symmetrical lattice pattern is desired, the strand systems are arranged in 120° angular relation to each other and having the crossover points of contiguous systems, disposed on a line perpendicular to the plane of the screen. This arrangment provides substantially equilateral triangular elemental screen areas, wherein any particular strand segment 110' is common to two adjacent areas.

As with the first form of the invention the preferred method of forming screens of the aforesaid character includes the provision of a winding form for properly receiving, spacing, and supporting the strands for subsequent operations thereon and for fastening them in their ultimate sheet form.

In Fig. 21 there is shown what might be called a two-screen form 132 which is adapted to be rotated on a spindle 133. The form is provided with sets of parallel grooves 134 for the reception of the strands 110. The grooves 134 are so formed in correlation as to size and shape with respect to the strands 110, that the strands do not bottom therein but engage only the side walls.

Since the strand systems 120, 121, and 122 are to be arranged in mutually angular relation, the winding form 132 has three sets of grooves 134 therein which are similarly arranged. Because the strands 110 are to be placed in the grooves 134 by a winding operation, which is preferably continuous for the strands of each of the systems, the sets grooves have varying depths. Thus the grooves to receive the strands of the system 122 are deepest; those to receive the strands of the next applied system 121 are less deep; and the set of grooves for the system 120 are the least deep.

With this form there is still another factor to be considered in connection with the groove formation. Not only must the grooves be designed so that the strands do not bottom therein, but at the same time they must support the strands of one system in such a manner that the strands of the next wound system touch or are in immediate proximity thereto at the crossover points. This is of course determined by simple calculation on the basis of strand diameter.

The actual shape and size of the form 132 may be altered, depending primarily on screen size and the number of screens to be simultaneously wound. The illustrative two-screen form, however, is of hexagonal shape providing pairs of parallel sides over which the strands are wound. So too, the instant form is appropriately formed as at 133*a* and 133*b* for the alternative reception of the spindle 133 to permit proper angular orientation of the form 132 for the reception of the successive strand systems. To insure that the strands snugly engage the grooves, the form 132 is preferably fashioned to present a convex or crowned outer surface.

It will be recalled that each strand includes a central conductor 112 for assisting in electron beam impingement control and for providing additional mechanical strength. Thus, as with the previously described line-screen, the instant screen is provided with a supporting frame 150 to which the ends of the strands 110 are secured. As shown in dotted outline in Fig. 25, the frame 150 is of generally hexagonal shape, and each side incorporates a pair of terminal strips 150*a* and 150*b* to which are connected the conductors 112 of the strands 110 of the two systems that traverse the particular frame side.

In forming the illustrative screen the strands 110 for each system are preferably separately coated with the desired phosphor and applied to the form 132 by separate winding operations. If a binder is used in the phosphor bath solution which will stick to the material of which the form is made, a preliminary step of preparing the form to resist such adherence might have to be taken. Such step would be the precoating, as by spraying, the form with a cellulosic substance or the like. This coating (not shown) should have the property of subliming at a temperature well below that at which the final heating of the screen is effected.

In the actual winding operations the strands of the system having the "weakest" phosphor, i.e., that having the lowest luminous intensity when activated, is preferably applied first; then the next "weakest"; and lastly the "strongest." This is preferable so as to place the "weakest" phosphor nearest the source of the electron beam, for the screen is mounted in a cathode-ray tube oppositely oriented with respect to its position on the winding form.

After the strands of each set are applied to the form 132, the ends of them are clamped to the frame 150 and the conductors 112 are connected to the proper terminal strips 150*a* or 150*b*. If desired, the connecting of the conductors 112 may be left for accomplishment subsequently and at another location. After the strands are clamped to the frame their outer or exposed surfaces thereof can be cleaned of the phosphor coating.

It might be noted here that if a binder such as "Kasil" is used, which is a commercially available product containing $SiO_2$ and $K_2O$ and a soluble salt dehydrating agent, in the phosphor baths, the coated strands are preferably only partially dried prior to winding. Thus upon contact with the strands of the previously wound system bonds are automatically formed at the crossover points thereof when the completely wound screen is ultimately heat-treated for drying and degasifying and subliming any coating with which the form 132 was pretreated.

After this is accomplished the portions of the strands 110 disposed outwardly of the frame 150 are severed and the frame with the screen in place therein is removed from the form 132. If "Kasil" or a similar binder is used which becomes of almost glasslike rigidity upon setting, the screen retains the arcuate shape in which it was fashioned on the form 132. Desirably therefore, the form 132 is given a curvature corresponding to that of the tube window or face in which the screen is to be incorporated. This permits the direct mounting of the screen on the inner surface of tube window. Thus the finished screen or the window surface may have a binder applied thereto causing the screen to adhere directly to the window upon suitable heat and vacuum treatment. Thereafter the window can be readily attached to the body portion of the tube envelope.

While the foregoing has been directed to describing the formation of fluorescent screens, it will be apparent that a grid structure suitable for use in electron beam impingement control can be similarly formed. Such a grid structure G is shown by way of illustration in Fig. 26. The grid structure there shown also includes three systems 120A, 121A and 122A of strands 110A so as to conform to the corresponding strand systems of the screen with which it is to be utilized. The grid strands include central conductors 112A and insulating coverings 114A, but of course, need no phosphor coating. Preferably they are of somewhat smaller diameter than the screen strands.

The grid structure G is mounted in a supporting frame (not shown) and the conductors 112A of the grid strand systems are suitably terminated in the same manner as the conductors 112 of the strands 110 of the screen S. This permits the application of suitable charges thereto for directing the electron beam as desired for impingement on the screen S. The grid G is, therefore, normally mounted in spaced relation to the screen S according to electron beam velocity. It will be apparent that, as shown in Fig. 24 the grid G and screen S can be premounted in spaced relation to each other for incorporation as a unit, or "color-pack" behind the window W of a cathode-ray tube envelope.

Since the reproduction of images in full color on screens of this type comprises what might be termed "color-addition," high-lighting to enhance picture definition is desirable, and in an additive process is accomplished by the use of white light. The present invention contemplates high-lighting by the provision of a phosphor fluorescing white light when activated. In Fig. 27 there is shown a modified form of screen S′ embodying the present invention and providing high-lighting by the incorporation of an additional strand system 123′. The strand system 123′ as shown, is placed in the same layer as the color fluorescing system 122 and thus is disposed adjacent the window of the cathode-ray tube in which the screen is used.

Still another form of screen, S″, is shown in Fig. 28. In this form a tricolor strand system identical with that shown in Fig. 22 is utilized in conjunction with a transparent plate, which may be the tube window, upon which the white-fluorescing, high-lighting phosphor is directly deposited. As shown the high-lighting phosphor is deposited in triangular areas H corresponding in size and location to the openings in the lattice formed by the strand systems 120, 121 and 122.

It will be apparent that by applying a proper negative charge to the conductors 112 of all of the strands of the systems 120, 121 and 122 the electron beam can be made to impinge on the white-fluorescing portions of these screens.

As hereinbefore noted, it has been proposed that a color-pack comprise dots of phosphors fluorescing the desired colors deposited on a transparent plate by means of a mask with the mask being utilized in spaced relation thereto for electron beam control. By the practice of the instant method such a mask can be quickly, accurately and economically made.

Referring now to Fig. 29, there is shown a mask M which is formed of conducting material fashioned in strips or ribbons 160. These ribbons 160 are arranged in three systems 160*a*, 160*b*, and 160*c*, which are separately applied to a grooved winding form 163 in the same manner (Fig. 21) as the strands 110 of the previously described screens and grids. In this instance, however, the grooves are flat bottomed and of substantially the same depth. As a result the outwardly projecting portions of the form give the appearance of short pegs P arranged in regular rows.

Since electron beam control is to be effected by masking and by the electromagnetic fields within the mask apertures the ribbons need not bear an insulating covering. Indeed the ribbons are preferably interconnected as by tack or spot welding at the portions of the mask M where portions of the ribbons 160 of each system are superimposed. It will be seen, of course, that the pegs P accurately define and locate the mask apertures. Further, since the ribbons 160 are fastened rigidly together, as by spot welding at 164, there is no need for as elaborate a supporting frame as is preferred for the previously described screen and grid structures. A simple support (not shown) is desirable, however, to impart additional rigidity to the mask. It will be apparent that additional rigidity can be imparted to the mask by forming the individual ribbons 160 of the upper and lower systems with outwardly extending flanges, i.e., such ribbons being fashioned of generally L-shaped cross section.

The present application is a continuation-in-part of my copending application Serial No. 241,200, filed August 10, 1951, now abandoned.

I claim as my invention:

1. The method of forming a multiple color fluorescent screen for a television tube comprising supplying a substantially translucent strand for each fundamental color desired, coating said strands respectively with phosphors fluorescing the desired colors, winding said strands under tension about a supporting form in parallel and closely spaced relation to each other, removing the phosphor coating from the exposed surfaces of said strands, fixing said strands together to form a sheet, removing a section of said sheet from said form for incorporation in the tube.

2. The method of forming a multiple color fluorescent screen for a television tube comprising supplying a generally cylindrical strand for each fundamental color desired, coating each strand respectively with a layer of phosphor fluorescing a desired color, drying the coated strands to set the phosphor coating thereon, placing said coated strands simultaneously in grooves formed in the periphery of a spacing and supporting form to hold successive runs of said strands in parallel and closely spaced relation, fixing said strands in said relation to the adjacent strands for effecting a sheetlike form, removing a section of the sheet for incorporation in the tube.

3. The method of forming a fluorescent screen for a television tube comprising supplying a conducting wire, applying an insulating covering about said wire to form a unitary strand, passing the strand through a bath containing a phosphor in agitated suspension so as to apply a coating of the phosphor thereto, passing the coated strand through an oven to drive off the bath fluid and fix the phosphor coating to the strand, winding the coated strand in successive closely spaced spiral grooves in the periphery of a spacing and supporting form in a single layer, fixing adjacent runs of the strand together to form a sheet, removing a section of the sheet for incorporation in the tube.

4. The method of forming multiple color fluorescent screens for a television tube comprising supplying a conductor for each primary color, applying a covering of translucent insulating material about each of said conductors to form a unitary strand, applying a layer of a phosphor fluorescing a desired primary color to each strand, fixing a supporting frame to a winding form, placing said coated strands about said form and over said frame in successive spaced runs in a single layer, fixing adjacent runs of the strand together to form a sheet, removing said coverings from said conductors only adjacent said frame and connecting the same to said frame, severing said strands beyond the ends of said frame, releasing said frame from said form, and removing the same with the section of said sheet attached thereto for incorporation in the tube.

5. The method of forming a fluorescent screen for a television tube comprising supplying a conducting wire, applying a translucent insulating covering of glass about said wire to form a unitary strand of an outer diameter of substantially eighty percent greater than that of said wire, passing the strand through a bath containing a phosphor in agitated suspension so as to apply a coating of the phosphor thereto, passing the coated strand through an oven to drive off the bath fluid and fix the phosphor coating thereto, supporting the coated strand at peripherally spaced points along its length in successive runs in a single layer upon a form, applying a coating of translucent cement uniformly over the exposed surfaces of the runs of the strand on the form to form the same into a composite sheet, treating the sheet in a vacuum oven to set said cement and remove any occluded gas or gas-forming material, and removing a section of said sheet for incorporation in the tube.

6. The method of forming a multiple color fluorescent screen for a television tube comprising supplying conducting wires, covering said wires with translucent insulating material to form unitary strands of a diameter at least eighty percent greater than the diameter of said wires, passing said strands respectively through baths each containing in agitated suspension phosphors fluorescing the desired color so as to apply a coating of phosphor thereto, passing the coated strands through an oven to drive off the bath fluid and fix the phosphor coatings thereto, supporting the coated strands at peripherally spaced points along their lengths and in closely spaced parallel relation upon a form in successive spaced runs and in a single layer, applying silicone-resinous cement uniformly over the cleaned exposed surfaces of the runs of the strands on the form, setting said cement by treating in a vacuum oven so as to form a unitary sheet, and removing a section of said sheet for incorporation in the tube.

7. The method of forming a component for multiple color fluorescent television tube comprising supplying a substantially translucent strand for each color desired, coating said strands respectively with phosphors fluorescing the desired colors, winding said strands under tension about a supporting form in predetermined relation to each other, removing the phosphor coating from the exposed surfaces of said strands, fixing said strands together to form a sheet, removing a section of said sheet from said form for incorporation in the tube.

8. The method of forming a component for a multiple color television tube comprising supplying a generally cylindrical strand for each fundamental color desired, coating each strand respectively with a layer of phosphor fluorescing a desired color together with a binder, partially drying the coated strands, placing said coated strand upon a form and engaging the same only along peripherally spaced longitudinal lines for supporting the strands throughout their lengths and protecting the coated strand surfaces adjacent the form, fixing said strands together in sheetlike form, and removing a section of the sheet for incorporation in the tube.

References Cited in the file of this patent

UNITED STATES PATENTS

| | | |
|---|---|---|
| 507,157 | Otis | Oct. 24, 1893 |
| 1,209,247 | Bastian | Dec. 19, 1916 |
| 1,472,505 | Trimble | Oct. 30, 1923 |
| 2,115,855 | Holman | May 3, 1938 |
| 2,135,072 | Forster | Nov. 1, 1938 |
| 2,446,440 | Swedlund | Aug. 3, 1948 |
| 2,451,360 | Skehan | Oct. 12, 1948 |
| 2,543,477 | Sziklai | Feb. 27, 1951 |
| 2,577,103 | Brian | Dec. 4, 1951 |
| 2,606,822 | Pakswer | Aug. 12, 1952 |
| 2,683,833 | Zaphiropoulos | July 13, 1954 |
| 2,704,879 | Diggle | Mar. 29, 1955 |
| 2,751,662 | Glenn et al. | June 26, 1956 |
| 2,824,251 | Patterson | Feb. 18, 1958 |
| 2,851,628 | Bongers | Sept. 9, 1958 |

FOREIGN PATENTS

| | | |
|---|---|---|
| 108,446 | Sweden | Sept. 14, 1943 |